Patented Feb. 24, 1942

2,274,057

UNITED STATES PATENT OFFICE 2,274,057

PROCESS FOR THE OXIDATION OF ALIPHATIC HYDROCARBONS

Robert A. Gerlicher, Baton Rouge, La., assignor to Standard Oil Development Company, a corporation of Delaware No Drawing. Application September 16, 1938, Serial No. 230,211

10 Claims. (Cl. 260—451)

This invention relates to an improved process for the oxidation of organic materials, in which organic materials are subjected to the action of free oxygen in the presence of improved catalysts. The invention relates more particularly to the use of such catalysts in the oxidation of aliphatic and cyclo-aliphatic or naphthenic hydrocarbons, such as paraffin wax and oils from paraffin base crudes, to produce oxygenated derivatives such as fatty acids and alcohols.

The oxidation of paraffin wax by blowing air through the melted wax in the presence of catalysts of the type of potassium manganate is already known. Such catalysts include compounds in which manganese is present in the anion and an alkali metal is present in the cation. Examples of such catalysts are potassium permanganate, potassium manganate, sodium permanganate, sodium manganate, and other corresponding manganese compounds and the alkali metals or ammonium. These catalysts are preferably not soluble in the hydrocarbon material to be oxidized and preferably admixed with this material in the form of a solution in a volatile solvent which is removed from the mixture before or during the commencement of the oxidation.

The liquid phase oxidation of paraffin wax to produce fatty acids with such catalysts is conducted with air or other gases containing free oxygen at temperatures between about 100 and 160° C. With especially active catalysts, such as those obtained when a solution of the catalyst is mixed with the oxidation charge and the solvent thereafter removed, the temperature is between about 100 and 120° C. Operation at the lower temperatures with such catalysts is preferred in the preparation of relatively pure fatty acids which are substantially free of hydroxy acids, lactones, and the like.

It has now been found that these oxidation processes described above may be conducted with greater efficiency using less catalyst and a shorter reaction time, and that improved products are secured by using, in addition to the potassium manganate type catalysts, a small amount of another compound of an alkali or alkaline earth metal of groups I and II of the periodic table of elements. This second catalyst includes the alkali and alkaline earth oxides, hydroxides, carbonates, and acid carbonates, also organic compounds such as the soaps of fatty acids and the salts of other organic acids, also metal alcoholates and metallo-organic compounds in which an organic radical is connected to the said metal by a carbon-to-carbon linkage. Inorganic acid salts of the said metals and other inorganic compounds of these metals are also included; it being preferred, however, that such compounds be free of metals of groups IV to VIII of the periodic table of elements.

The following examples illustrate suitable processes for carrying out the herein described invention:

Several portions of the same crude scale wax derived from petroleum were oxidized to produce fatty acids in a number of comparative processes in which only the nature of the catalyst was varied. In these oxidations the catalyst was added in a water solution to the melted wax and air was forced through this mixture at the rate of 0.21 cubic meter per hour per kilogram of wax until the unsaponifiable content was reduced to 65%. The fatty acids were obtained in a crude state by neutralizing the oxidation products with aqueous alkali at a temperature of about 170° C. and a pressure of about 100 pounds per square inch gauge. The resulting water solution of the soaps was separated from the water insoluble material and the aqueous solution was then extracted with 54° naphtha to remove unsaponifiable material from the soap solution (adding isopropyl alcohol to prevent emulsification). The aqueous soap solution was then acidified with dilute sulfuric acid to set free the fatty acids. These were dried and then fractionated by distillation under vacuum. The fraction distilling with steam between 150 and 280° C. at an absolute pressure of 8 to 12 mm. of mercury, is used for soap manufacture and the yield and color of this fraction are indications of the efficiency of the process. The color of the fatty acids is of great importance as any color is carried over into the soap products made from the acids. The time required to accomplish the oxidation is also of great importance from the economic standpoint.

The operating conditions and results obtained in five comparative oxidation runs are given in the following table:

*Oxidation of crude scale wax*

|  | Run No. | | | | |
| --- | --- | --- | --- | --- | --- |
|  | 1 | 2 | 3 | 4 | 5 |
| Catalyst, wt. percent of charge: | | | | | |
| KMnO₄ | 0.1 | 0.1 | 0.15 | 0.20 | 0.35 |
| Soda ash | 0.068 | 0.0 | 0.0 | 0.0 | 0.0 |
| Temperature, °C | 110 | 110 | 110 | 115 | 115 |
| Time, hours | 18 | 18 | 20–21 | 20 | 40 |
| Unsaponifiable content, percent | 65 | 65 | 65 | 65 | 65 |
| Fatty acids: | | | | | |
| Yield of purified fatty acids (boiling between 150° and 280°C. at 4 mm. pressure), percent | 74 | 69 |  |  | 67 |
| Color (Lovibond scale): | | | | | |
| Red | 2.4 | 4.2 |  |  | 0.6 |
| Yellow | 27 | 30 |  |  | 9 |

By comparing runs 1 and 2 it is seen that the yield and color of the purified fatty acid soap-making fraction were considerably better in run 1 in which the catalyst consisted of potassium permanganate with excess alkali than in run 2 in which the same amount of potassium permanganate was used with no addition of alkali. Runs 3, 4 and 5 indicate that a product having good color is obtained by increasing the amount of potassium permanganate in the catalyst. However, the time required for the oxidation is greatly increased and the yield of the fatty acids remains substantially less than that obtained in run 1. Also, when using the larger amounts of potassium permanganate catalysts, difficulties are encountered in removing the much larger quantities of hydrated oxides of manganese which are precipitated during the work-up of the oxidation products.

In similar comparative runs it has been found that equal to better quality oxidation products are obtained with the following catalyst combinations with a reduction in the oxidation time of 1 to 6 hours less than that required when 0.15% of potassium permanganate alone is used: 0.10% potassium permanganate with 0.034% soda ash; 0.10% potassium permanganate with 0.068% soda ash. The quantities are expressed as weight per cent of the oxidation charge.

The proportion of the added alkali metal compound to the manganate type catalyst may vary over a considerable range which includes ratios from about 0.5 to about 5 atoms of the alkali metal per atom of manganese in the respective catalyst compounds. The proportion of the total catalyst may also range from about 0.05 up to about 0.3% by weight of the oxidation charge. These figures are all presented as examples of suitable operating ranges and are not intended to indicate the limits of the composition or concentration of the catalyst.

The alkali metal compound may be added directly to the oxidation charge, this being the preferred procedure when the alkali metal compound is soluble in the melted paraffin wax or other oxidation charge. Materials insoluble in the charge may be finely ground and supplied thereto in a highly dispersed state or are preferably dissolved in a volatile solvent, such as water in the case of water soluble compounds, the solution added to the charge and the solvent then evaporated prior to or during the early part of the oxidation treatment. Water soluble compounds of the alkali metals may be prepared in a mixed aqueous solution with the manganate catalyst and the solution then added to the oxidation charge. Such procedure is preferable when the alkali metal compound does not cause a precipitate to form with the manganate type catalyst in the aqueous solution.

The hydrocarbon materials to be oxidized may consist of various fractions of crude petroleum oils, such as sweater oil, gas oil, petrolatum, deoiled petrolatum, paraffin wax, crude scale wax, and the hydrocarbon products (preferably non-aromatic) obtained from the cracking, hydrogenation, destructive hydrogenation, and pressure liquefaction of hydrocarbons, tar, coal, lignite, and the like, or hydrocarbon products obtained in the hydrogenation of carbon oxides.

These improved catalyst mixtures may also be used in the oxidation of other organic materials besides the aliphatic and naphthenic hydrocarbons particularly described above, and in general are preferred catalysts in all oxidations in which the catalysts of the type of potassium permanganate are used. The improved catalyst mixtures of this invention may be used, for example, in the oxidation of ketones to fatty acids with air or oxygen, in similar oxidations of alcohols and aldehydes.

This invention is not to be limited by any examples presented above, all of which are intended solely for purpose of illustration, but is limited only by the following claims, in which it is desired to claim all novelty insofar as the prior art permits.

I claim:

1. Process for oxidizing organic materials to form oxygenated organic compounds therefrom, comprising subjecting a higher petroleum hydrocarbon to treatment with a gas comprising oxygen at a reaction temperature in the presence of an added solution of catalyst containing a compound having manganese in the anion and a member of the group consisting of alkali metals and ammonium in the cation and a second compound of a metal selected from the group of alkali and alkaline earth metals of groups I and II of the periodic table of elements.

2. Process for the oxidation of higher aliphatic hydrocarbons to form fatty acids, comprising subjecting said hydrocarbons to oxidation with a gas comprising oxygen at a reaction temperature in the presence of an added solution of catalyst containing a compound having manganese in the anion and a member of the group consisting of the alkali metals and ammonium in the cation and a second compound of a metal selected from the group consisting of alkali and alkaline earth metals of groups I and II of the periodic table of elements.

3. Process according to claim 2 in which the alkali metal compound is an alkaline oxy compound of an alkali metal.

4. Process according to claim 2 in which the catalyst comprises potassium permanganate and a second compound which is a member of the group consisting of an alkali and alkaline earth metal of groups I and II of the periodic table of elements.

5. Process for the oxidation of paraffin wax to fatty acids comprising subjecting the said wax to oxidation with air at a temperature between about 100 and 160° C. in the presence of an aqueous solution of potassium permanganate and soda ash.

6. Process according to claim 5 in which the said oxidation temperature is about 100 to about 120° C.

7. Process according to claim 2 in which the said added solution contains not more than about 0.15% of the manganese-containing compound, based on the weight of the said hydrocarbons.

8. Process according to claim 5 in which the said added solution contains about 0.10% of potassium permanganate, based on the weight of the said paraffin wax.

9. Process according to claim 2 in which the said first-mentioned catalyst compound contains an $MnO_4$ radical as the anion and a member of the group consisting of the alkali metals and ammonium as the cation.

10. Process for oxidizing higher aliphatic hydrocarbons to form fatty acids, comprising subjecting said hydrocarbons to oxidation with a gas comprising oxygen at a reaction temperature in the presence of an added solution of catalyst containing a compound having manganese in the anion and a member of the group consisting of the alkali metals and ammonium in the cation, and a second compound of an alkaline earth metal.

ROBERT A. GERLICHER.